(12) United States Patent
Hanson

(10) Patent No.: US 7,951,318 B2
(45) Date of Patent: May 31, 2011

(54) APPARATUSES, SYSTEMS, AND METHODS FOR MANUFACTURING COMPOSITE PARTS

(75) Inventor: Steven F. Hanson, Derby, KS (US)

(73) Assignee: The Boeing Company, Chicago, IL (US)

(*) Notice: Subject to any disclaimer, the term of this patent is extended or adjusted under 35 U.S.C. 154(b) by 815 days.

(21) Appl. No.: 11/927,003

(22) Filed: Oct. 29, 2007

(65) Prior Publication Data

US 2008/0054523 A1 Mar. 6, 2008

Related U.S. Application Data

(62) Division of application No. 10/953,670, filed on Sep. 29, 2004, now Pat. No. 7,306,450.

(51) Int. Cl.
*B32B 37/00* (2006.01)

(52) U.S. Cl. ........ 264/257; 264/258; 264/510; 156/242; 156/245

(58) Field of Classification Search .......... 264/510, 264/257, 258; 156/242, 245
See application file for complete search history.

(56) References Cited

U.S. PATENT DOCUMENTS

| | | | |
|---|---|---|---|
| 1,504,547 A | 8/1924 | Egerton | |
| 2,750,629 A | 6/1956 | Baudou | |
| 3,376,184 A | 4/1968 | Ritchey | |
| 3,526,558 A | 9/1970 | Beeson | |
| 3,975,363 A | 8/1976 | Jones | |
| 4,132,755 A | 1/1979 | Johnson | |
| 4,338,070 A | 7/1982 | Nava et al. | |
| 4,416,170 A | 11/1983 | Gibson et al. | |
| 4,443,401 A | 4/1984 | Turner | |
| 4,780,262 A | 10/1988 | Von Volkli | |
| 4,902,215 A * | 2/1990 | Seemann, III | 425/406 |
| 4,922,232 A | 5/1990 | Bosich | |
| 4,933,232 A | 6/1990 | Trout et al. | |
| 5,129,813 A | 7/1992 | Shepherd | |
| 5,152,949 A * | 10/1992 | Leoni et al. | 264/257 |
| 5,178,812 A | 1/1993 | Sanford et al. | |
| 5,286,438 A | 2/1994 | Dublinski et al. | |
| 5,292,475 A * | 3/1994 | Mead et al. | 264/257 |
| 5,366,684 A | 11/1994 | Corneau, Jr. | |

(Continued)

FOREIGN PATENT DOCUMENTS

DE 19536675 2/1997

(Continued)

OTHER PUBLICATIONS

A composite Preform (1pg); http://www.priorartdatabase.com/IPCOM/000007326 [accessed Apr. 28, 2004].

(Continued)

*Primary Examiner* — Jeff H Aftergut
(74) *Attorney, Agent, or Firm* — Perkins Coie LLP

(57) ABSTRACT

Tooling aids for applying pressure in laminating, and methods for their use, are described herein. In one embodiment, a caul for applying pressure in laminating includes a base portion positioned between first and second corner portions. The base portion can have a curved shape when it is in a relaxed state, but it moves to a flatter shape when subjected to pressure during lamination. Movement of the base portion to the flatter shape causes the first and second corner portions to move outwardly and away from the base portion. In this manner, the caul can be used to compact laminating materials into corner regions of a corresponding female mold surface.

12 Claims, 6 Drawing Sheets

U.S. PATENT DOCUMENTS

| | | | |
|---|---|---|---|
| 5,464,337 | A | 11/1995 | Bernardon et al. |
| 5,690,973 | A | 11/1997 | Kindt-Larsen et al. |
| 5,772,950 | A | 6/1998 | Brustad et al. |
| 5,824,255 | A | 10/1998 | Ross et al. |
| 5,830,305 | A | 11/1998 | Andersen et al. |
| 6,159,414 | A | 12/2000 | Tunis, III et al. |
| 6,229,819 | B1 | 5/2001 | Darland et al. |
| 6,245,275 | B1 * | 6/2001 | Holsinger ............ 264/257 |
| 6,511,570 | B2 | 1/2003 | Matsui et al. |
| 6,558,590 | B1 | 5/2003 | Stewart |
| 6,692,681 | B1 | 2/2004 | Lunde |
| 6,749,784 | B2 | 6/2004 | Blanchon et al. |
| 6,843,953 | B2 * | 1/2005 | Filsinger et al. ........ 264/510 |
| 6,862,989 | B2 | 3/2005 | Belanger et al. |
| 7,334,782 | B2 | 2/2008 | Woods et al. |
| 2003/0234471 | A1 | 12/2003 | Kuroiwa et al. |
| 2004/0071870 | A1 | 4/2004 | Knowles et al. |
| 2004/0145095 | A1 | 7/2004 | McCollum et al. |
| 2004/0219855 | A1 | 11/2004 | Tsotsis |
| 2005/0059309 | A1 | 3/2005 | Tsotsis |
| 2006/0017200 | A1 | 1/2006 | Cundiff et al. |
| 2006/0071817 | A1 | 4/2006 | Greene |
| 2006/0166003 | A1 | 7/2006 | Khabashesku et al. |
| 2007/0176323 | A1 | 8/2007 | Jones et al. |
| 2008/0286564 | A1 | 11/2008 | Tsotsis |

FOREIGN PATENT DOCUMENTS

| | | |
|---|---|---|
| EP | 0659541 | 6/1995 |
| EP | 1136239 | 9/2001 |
| FR | 2667013 | 3/1992 |
| FR | 2771332 | 5/1999 |
| FR | 2844472 | 3/2004 |
| JP | 2001310798 A | 11/2001 |
| WO | WO-2004025003 A2 | 3/2004 |
| WO | WO-2005/095091 | 10/2005 |

OTHER PUBLICATIONS

Musch G. et al.: "Tooling with Reinforced Elastomeric Materials" Composites Manufacturing, Butterworth Scientific, Guildford, Surrey, GB, vol. 3, No. 2, Jan. 1992, pp. 101-111, XP000300776 ISSN: 0956-7143 col. 1, paragraph 3-col. 2, paragraph 2 figures 9, 10, 16.

Woods, et al. Controlled Atmospheric Pressure Resin (17 pgs).

European Search Report for Application No. 08012344, The Boeing Company, Dated Aug. 5, 2008, 6 pages.

Ando, Yoshinori et al., "Growing Carbon Nontubes," Materials Today, Oct. 2004, pp. 22-29, ISSN:1369 7021.

Brittles, P., New Development in RTM, 19th International BPF Composites Congress, BPF, Birmingham., Nov. 22-23, 1994, pp. 11-26 (8141 OA).

Garcia, E.J. et al., "Hybrid Carbon Nanotube-Composite Architectures," MTL Annual Research Report, Sep. 2006, 1 pg.

Growing Carbon Nanotubes Aligned with Patters; http://www.nasatech.com/Briefs/Oct02/NPO30205.html; accessed Mar. 21, 2007, 4 pgs.

The Longest Carbon Nanotubes You Have Ever Seen; http://www.spacemart.com/reports/The_Longest_Carbon_Nanotubes_You_Have_Ever_Seen_999.html; May 14, 2007; Space Mart.

Wondrous World of Carbon Nanotubes; http://students.chem.tue.nl/ifp03/synthesis.html; accessed Mar. 21, 2007; 23 pgs.

PCT International Search Report and Written Opinion, International Application No. PCT/US2005/033279, Applicant: The Boeing Company, dated May 19, 2006, 20 pages.

* cited by examiner

APPARATUSES, SYSTEMS, AND METHODS FOR MANUFACTURING COMPOSITE PARTS

CROSS-REFERENCE TO RELATED APPLICATION

This application is a divisional of U.S. application Ser. No. 10/953,670, filed Sep. 29, 2004, now U.S. Pat. No. 7,306,450.

TECHNICAL FIELD

The following disclosure relates generally to composite part manufacturing and, more particularly, to apparatuses, systems, and methods for laminating fiber-reinforced resin materials on female tools.

BACKGROUND

Fiber-reinforced resin materials, or "composite materials" as they are commonly known, offer a number of advantages over conventional metal materials including high strength-to-weight ratios and good corrosion resistance. Conventional composite materials typically include glass, carbon, or polyaramide fibers in woven and/or non-woven configurations. In the raw material stage, the fibers can be pre-impregnated with resin or left dry. If dry, the fibers can be infused with resin after lay-up on a mold surface. Heat and/or pressure can be applied to the resin-impregnated fibers on the mold surface to cure the resin and harden the laminate in the shape of the mold. The heat and pressure can be applied with an oven, an autoclave, a heated flat or contoured forming tool, or a combination of methods including the use of a vacuum bag.

Composite parts can be formed in the above manner on both male and female tools. With male tools, the fiber plies are applied to an exterior mold surface that forms an inner mold line of the part. Adding plies to the lay-up on a male tool increases the thickness of the part and changes the outer mold line, but the inner mold line remains unchanged. Conversely, with female tools, the fiber plies are applied to an interior mold surface that forms an outer mold line of the part. Adding plies to the lay-up on a female tool increases the thickness of the part and changes the inner mold line, but the outer mold line remains unchanged.

Female tools are desirable when the mating surface is located on the exterior of a part because female tools allow the outer mold line (i.e., the exterior surface) to be tightly controlled. Female tooling (also known as "outer mold line tooling") is also desirable when making multiple parts having the same external dimensions but different thicknesses. Aircraft fuselages, for example, often have multiple frames with the same external dimensions but different thicknesses. In this situation, all of the frames can be made with a single female tool because the tool allows the thickness to vary without changing the external dimensions. If future growth of the aircraft requires further thickening of the frames, this can be achieved without changing tooling. Conversely, if male tooling were used, then a separate tool would be required for each different frame thickness.

One problem that arises when manufacturing composite parts with female tooling, however, is that the fiber plies tend to bridge and/or wrinkle across internal radii on the mold surface. FIG. 1, for example, illustrates a cross-sectional end view of fiber material 110 laid up on a portion of a female tool 102 in accordance with the prior art. The female tool 102 includes an interior mold surface 104 having a first side region 103 spaced apart from a second side region 105 by a radius region 106. A vacuum bag 120 is positioned over the fiber material 110 and evacuated to compress the fiber material 110 against the mold surface 104. As the vacuum bag 120 is being evacuated, the outside air pressure presses the fiber material 110 firmly against the side regions 103 and 105, resisting movement of the fiber material 110 into the radius region 106. This resistance causes the fiber material 110 to bridge across the radius region 106, thereby reducing the fiber density in this region. The reduction in fiber density in this region can compromise the structural integrity of the finished part.

SUMMARY

The present invention is directed generally toward apparatuses, systems, and methods for manufacturing composite parts and other laminated parts with female tools. A caul configured in accordance with one aspect of the invention includes a base portion positioned between first and second corner portions. The term "caul" is used throughout this disclosure to refer broadly to a device or piece of material configured to apply pressure in laminating. The base portion of the caul has a curved shape when it is in a relaxed state, but moves to a flatter shape when it is subjected to pressure during lamination. Flattening the base portion in this manner causes the first and second corner portions to move outwardly and away from the base portion.

A system for manufacturing a laminate in accordance with another embodiment of the invention includes a tool having a mold surface configured to support the laminate. The mold surface can include a side region positioned between first and second transition regions. The system can further include a caul configured to apply pressure to the laminate on the mold surface. The caul can include a curved base portion positioned between first and second corner portions. Pressing the base portion of the caul toward the side region of the mold surface causes the base portion to flatten and drive the first and second corner portions outwardly toward the first and second transition regions, respectively, of the mold surface.

A method for manufacturing a fiber-reinforced resin part in accordance with a further aspect of the invention includes positioning a plurality of fibers on a mold surface of a tool, and positioning a curved base portion of a caul over a first portion of the fibers. The method further includes pressing the curved base portion toward a side region of the mold surface. Pressing the curved base portion in this manner flattens the base portion against the first portion of fibers and compresses a second portion of the fibers against a transition region of the mold surface.

DETAILED DESCRIPTION

The following disclosure describes apparatuses, systems, and various methods for manufacturing composite parts. Certain details are set forth in the following description and in FIGS. 2A-4 to provide a thorough understanding of various embodiments of the invention. Other details describing well-known structures and systems often associated with composite parts and composite part manufacturing, however, are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 230 is first introduced and discussed with reference to FIG. 2.

Figure 1:
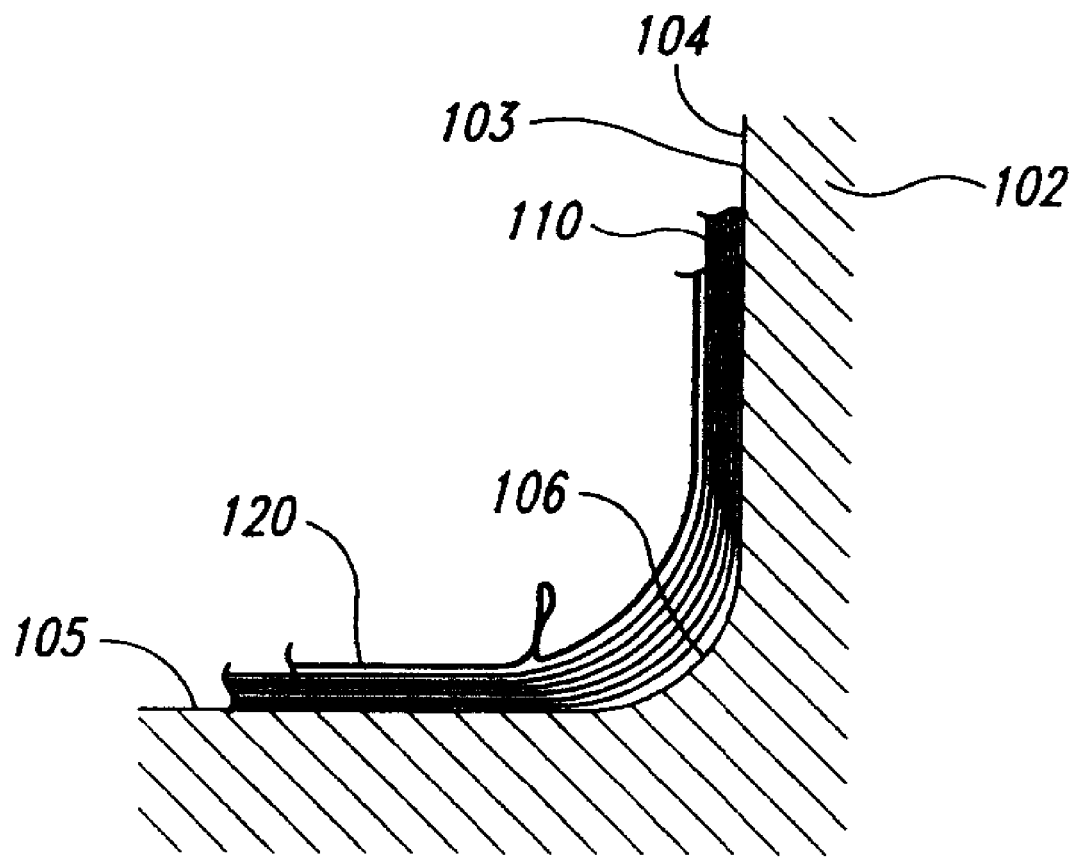
FIG. 1 is a cross-sectional end view of a prior art system for laminating fiber material on a female tool.
Figure 2:
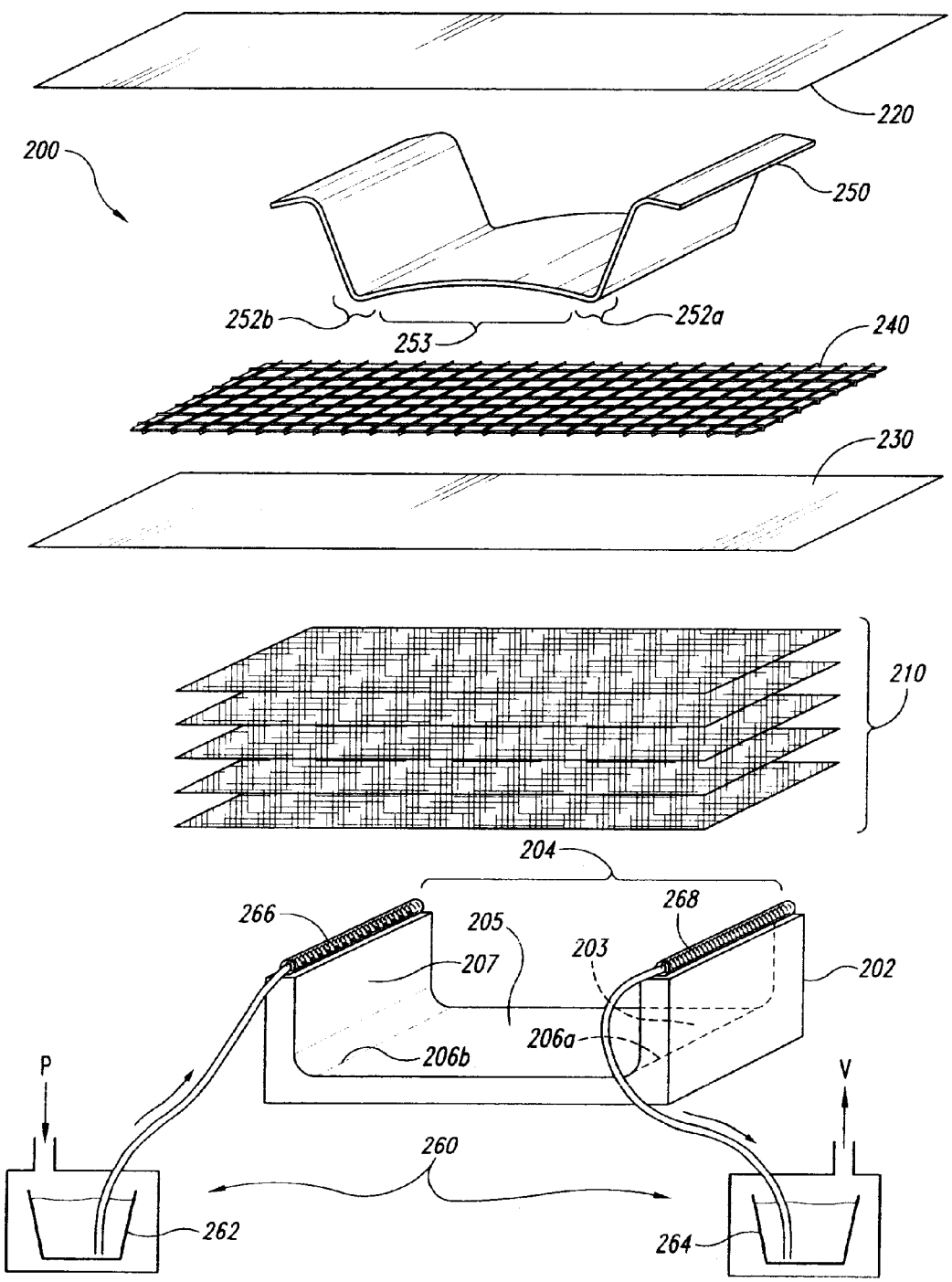
FIG. 2 is an exploded isometric view of a system for laminating material on a female tool in accordance with an embodiment of the invention.

FIG. 2 is an exploded isometric view of a manufacturing system 200 for laminating a plurality of fiber plies 210 together in accordance with an embodiment of the invention. In one aspect of this embodiment, the manufacturing system 200 includes a female tool 202 having a mold surface 204 configured to support the fiber plies 210 during lamination. The mold surface 204 can include a first side region 203 spaced apart from a second side region 205 by a first transition region 206a, and a third side region 207 spaced apart from the second side region 205 by a second transition region 206b. In the illustrated embodiment, the transition regions 206 include surfaces defining internal radii. In other embodiments, however, the transition regions 206 can have other shapes without departing from the spirit or scope of the present invention. Such shapes can include, for example, beveled surfaces, partially beveled surfaces, and curved surfaces having elliptical, oval, and other curved components.

In another aspect of this embodiment, the manufacturing system 200 can further include a release layer 230, a flow media or medium 240, and a caul 250. The release layer 230 acts as a separator between the fiber plies 210 and the flow medium 240. Various materials known in the art are suitable for this purpose, including materials that do not bond to epoxies and other resins such as fluorinated ethylene propylene (FEP), high density polyethylene (PE), and nylon.

The flow medium 240 can have an uneven surface texture that facilitates the diffusion of resin through the fiber plies 210 when the plies are sandwiched between the caul 250 and the mold surface 204. In one embodiment, for example, the flow medium 240 can include a plurality of grooves formed on an exterior surface. In another embodiment, the flow media can include a plurality of ridges arranged in a grid or other pattern. In further embodiments, the flow medium 240 can be formed from screen, mesh, weave, and/or other perforated materials. These embodiments of the flow medium 240 can be manufactured from various materials including polypropylene, polyethylene, nylon, polyester, thermoplastic, and polyvinylchloride.

The caul 250 is a tooling aid having a base portion 253 positioned between a first corner portion 252a and a second corner portion 252b. In the illustrated embodiment, the base portion 253 includes a curved or cambered web portion extending between the two corner portions 252. In other embodiments, the caul 250 can have other shapes, including other more linear shapes. For example, in another embodiment the base portion 253 can have an inverted V shape, or a partial-inverted V shape.

The base portion 253 is configured to be positioned proximate to the second side region 205 of the mold surface 204. The first corner portion 252a is configured to be positioned proximate to the first transition region 206a of the mold surface 204, and the second corner portion 252b is configured to be proximate to the second transition region 206b. Once the caul 250 has been positioned on the tool 202 in the foregoing manner, the sealing layer 220 can be placed over the caul 250 and evacuated. As explained in greater detail below, the resulting pressure flattens the base portion 253 against the fiber plies 210 and presses the plies against the mold surface 204. In other embodiments, other types of pressure, e.g., mechanical and/or manual pressure, can be used to flatten the base portion 253 against the fiber plies 210.

The caul 250 can be manufactured from any number of suitable materials that flex under external pressure. Such materials can include materials that behave elastically through a range of deflections. In one embodiment, for example, the caul 250 can be formed from sheet metal, such as stainless steel. In another embodiment, the caul 250 can be formed from thermoplastic materials using a rotomolding process, a vacuum forming process, and/or other known processes. One advantage of using thermoplastic materials is that they are easily formed and relatively inexpensive. As a result, the caul 250 can be disposed of after a single use without incurring significant costs.

The manufacturing system 200 can be used in accordance with embodiments of the invention to laminate fiber plies that are initially dry or pre-impregnated with resin. If the fiber plies 210 are initially dry, then the manufacturing system 200 can include a resin infusion system 260 to infuse the plies 210 with resin after the plies 210 have been arranged on the mold surface 204 in, e.g., a "preform." In this embodiment, the resin infusion system 260 can include a resin fill pot 262 and a resin drain pot 264 (shown schematically in FIG. 2 and not to scale). As described in greater detail below, resin from the fill pot 262 flows into the plies 210 via a perforated inlet runner 266 positioned toward one side of the female tool 202. Excess resin then flows out of the plies 210 and into the drain pot 264 via a perforated outlet runner 268 positioned toward an opposite side of the female tool 202.

Figure 3A:
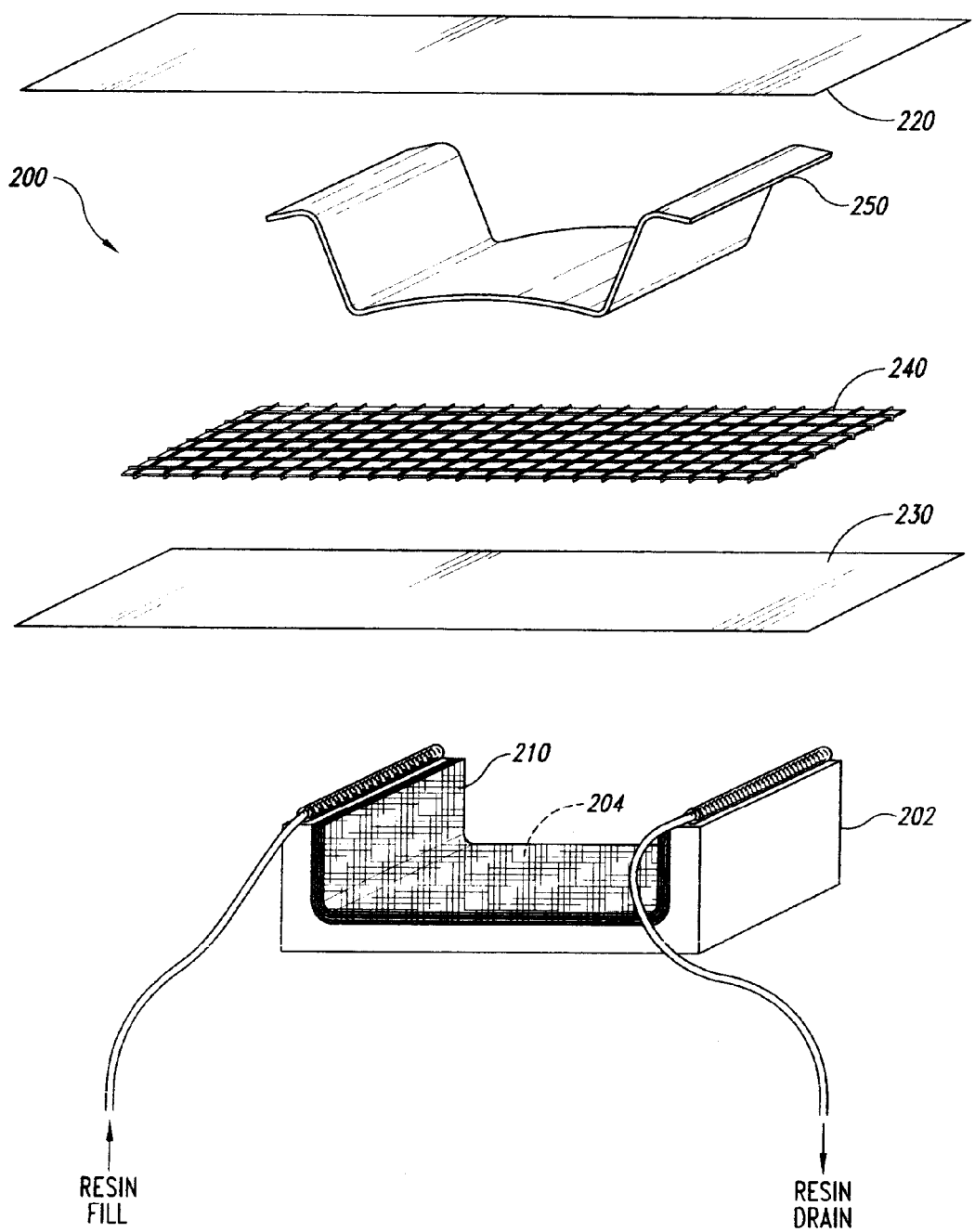
FIGS. 3A-3D include isometric and cross-sectional end views illustrating various stages in a method for manufacturing a laminated part in accordance with an embodiment of the invention.
Figure 3B:
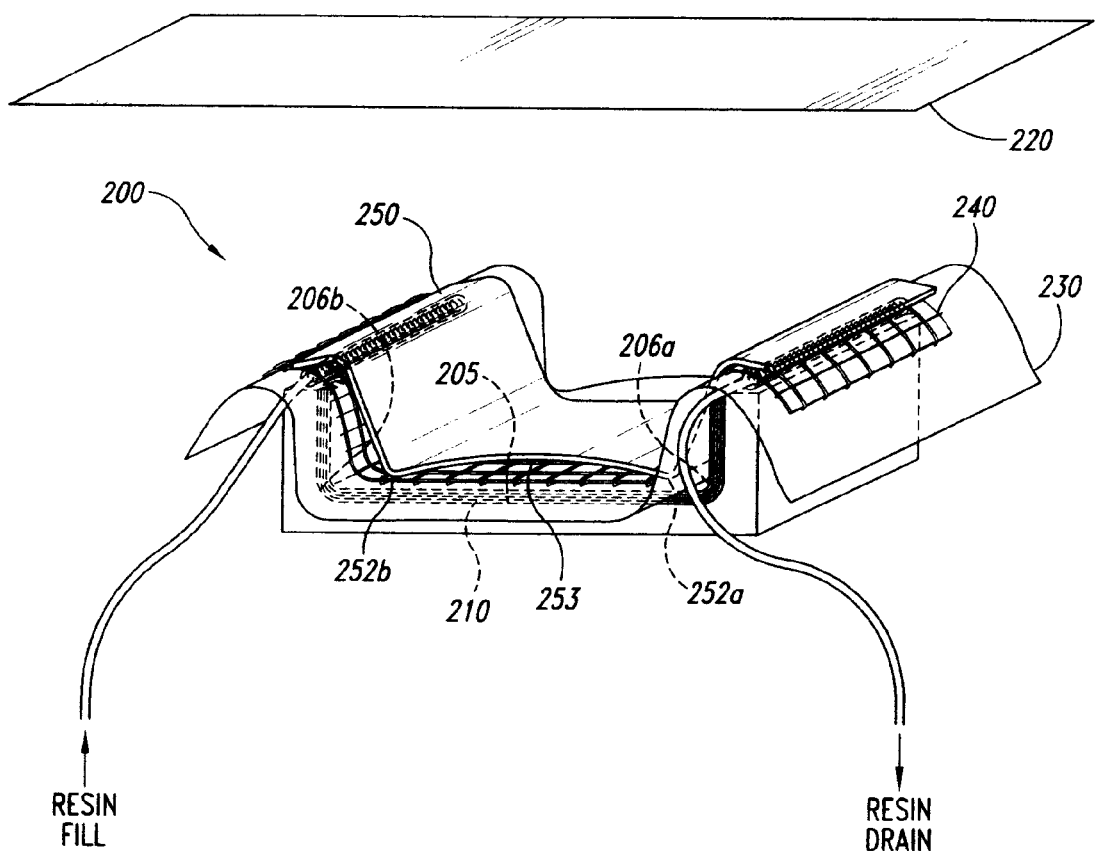
Figure 3C:
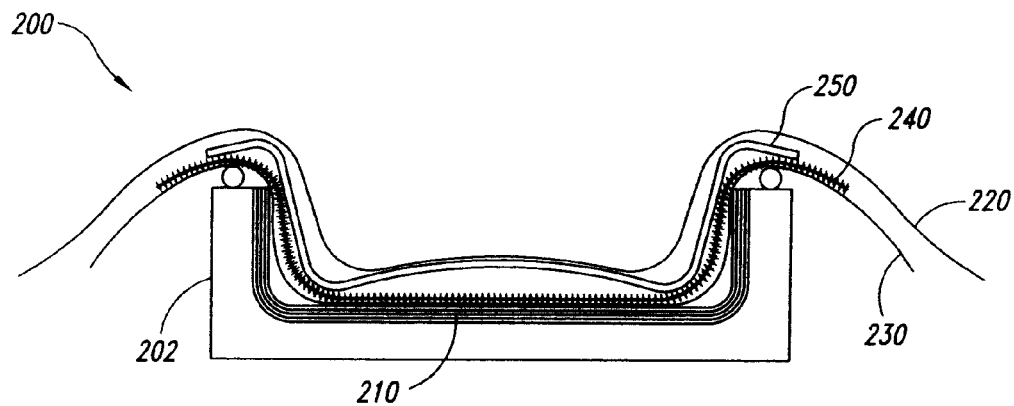
Figure 3D:
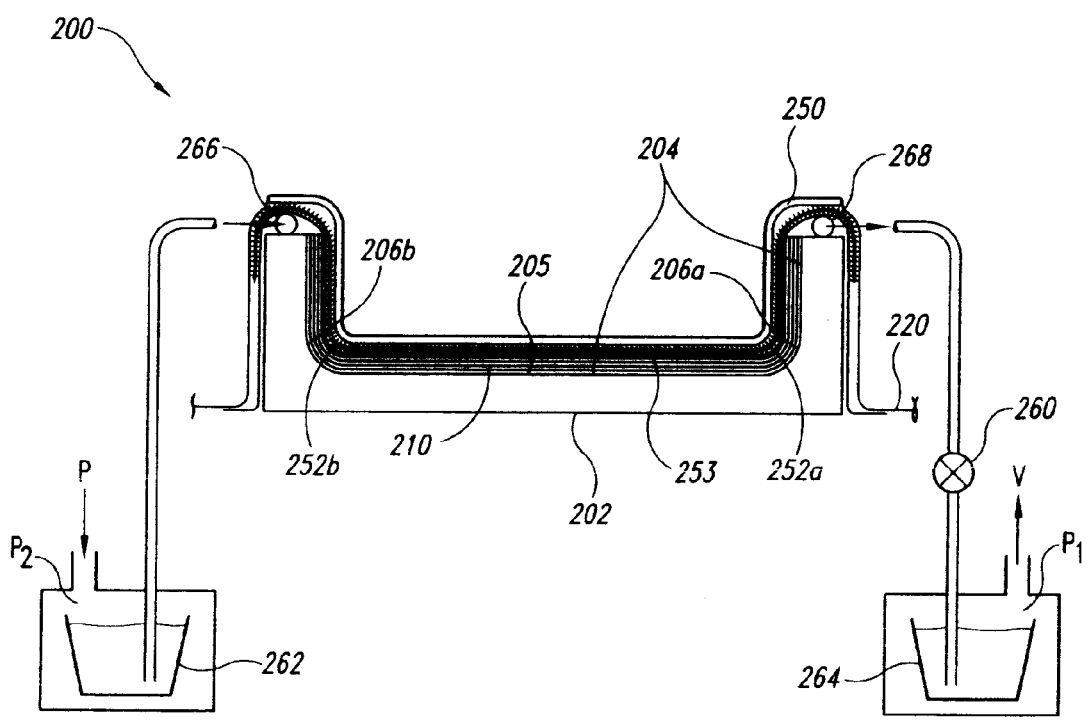

FIGS. 3A and 3B are isometric views, and FIGS. 3C and 3D are cross-sectional end views, illustrating various stages of a method for manufacturing a composite part with the manufacturing system 200 described above with reference to FIG. 2. Referring first to FIG. 3A, this view shows the fiber plies 210 after they have been arranged on the mold surface 204 of the female tool 202. In FIG. 3B, the release layer 230 is laid over the fiber plies 210, and the flow medium 240 is in turn laid over the release layer 230. Next, the caul 250 is positioned over the flow medium 240 so that the base portion 253 is positioned proximate to the second side region 205 of the mold surface 204 and the first and second corner regions 252a and 252b are positioned proximate to the first and second transition regions 206a and 206b, respectively. Referring next to FIG. 3C, the sealing layer 220 is laid over the caul 250 and sealed around the outside of the tool 202 using a suitable method known in the art. Next, the space under the sealing layer 220 is evacuated to compress the caul 250 against the fiber plies 210.

FIG. 3D illustrates the manufacturing system 200 after the sealing layer 220 has been evacuated. As shown, the resulting external pressure causes the base portion 253 of the caul 250 to flex downwardly compressing the fiber plies 210 against the second side region 205 of the mold surface 204. Flexing the base portion 253 downwardly in this manner drives the corner portions 252 outwardly toward the corresponding transition regions 206 of the mold surface 204. The corner portions 252 press the fiber plies 210 into the transition regions 206 with sufficient force to prevent fiber bridging and/or wrinkling in these areas. Thus, use of the caul 250 in the foregoing manner can help ensure that the finished part has sufficient fiber/resin density in the transition regions.

As mentioned above, the manufacturing system 200 can be used in a number of different embodiments to laminate both pre-impregnated fiber plies and fiber plies that are initially dry. If pre-impregnated plies are used, then there is no need to infuse the plies with resin after they have been compacted against the mold surface 204 as described above. In such embodiments, the fiber plies 210 can be cured after compacting by the application of heat and/or pressure in a suitable oven or autoclave.

Alternatively, if the fiber plies 210 are initially dry, then resin can be infused into the plies at the perform stage using a number of different methods. In one method, for example, the fiber plies 210 are first compressed against the mold surface 204 as described above with reference to FIGS. 3A-3D. Next, a valve 260 is closed and the resin drain pot 264 is evacuated to a first pressure $P_1$ of, e.g., from about 0 PSIA to about 2 PSIA. The resin fill pot 262 is left at a second pressure $P_2$ of, e.g., about ambient pressure, that is, about 14.7 PSIA. The valve 260 is then opened and the pressure differential between the drain pot 264 and the fill pot 262 causes resin to flow from the fill pot 262 into the compressed fiber plies 210 (i.e., into the "preform") via the inlet runner 266. After the resin has diffused through the fiber plies 210, it flows into the drain pot 264 via the outlet runner 268.

A potential disadvantage of flowing resin into the fiber plies 210 in the foregoing manner is that the resin pressure in the plies 210 tends to equalize with the external pressure once the plies 210 are saturated. As a result, the external pressure alone may be insufficient to adequately compress the fiber plies 210 during cure. One way to avoid this problem is to use a supplemental mechanical device (not shown) to apply an external force to the caul 250 after resin infusion and during cure. Another approach is to re-evacuate the sealing layer 220 after the resin infusion process.

Yet another method for avoiding the pressure equalization problem described above is to hold the resin fill pot 262 at a partial vacuum pressure during the resin infusion process, rather than letting it come up to ambient pressure. For example, in one embodiment, the fill pot 262 can be held at a partial vacuum pressure of about one-half an atmosphere, e.g., about 7 PSIA, while the resin drain pot 264 can initially be evacuated to, e.g., from about 0 PSIA to about 2 PSIA. In this way, the fiber plies 210 will have a net external pressure of about 7 PSIA exerted on them after the resin infusion process and during cure.

The various fill and drain pot pressures described above are provided by way of example. In other embodiments, one or more of these pressures, and/or one or more of the resulting pressure differentials, may differ from those described above without departing from the spirit or scope of the present invention.

Suitable methods for infusing fiber plies with resin are described in detail in co-pending U.S. patent application Ser. No. 10/485,725, entitled "Controlled Atmospheric Pressure Resin Infusion," filed May 28, 2003 as PCT Application PCT/US03/16794, and incorporated herein in its entirety by reference. In addition, various mechanical, pneumatic, and/or hydraulic devices for applying pressure to material plies during lamination are disclosed in co-pending U.S. patent application Ser. No. 10/899,660, entitled "Methods and Systems for Manufacturing Composite Parts with Female Tools," filed Jul. 26, 2004, and incorporated herein in its entirety by reference.

Figure 4:
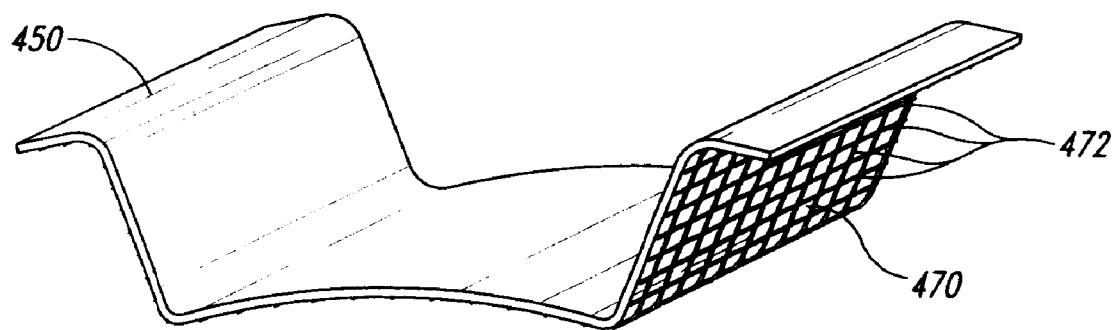
FIG. 4 is an isometric view of a caul for applying pressure in laminating in accordance with an embodiment of the invention.

FIG. 4 is an isometric view of a caul 450 configured in accordance with another embodiment of the invention. Various aspects of the caul 450 can be at least generally similar in structure and function to the caul 250 described above with reference to FIGS. 2-3D. In one aspect of this particular embodiment, however, the caul 450 includes an exterior portion 470 having an uneven (i.e., a non-smooth) surface texture. For example, in the illustrated embodiment, the exterior portion 470 includes a plurality of ridges 472 arranged in a grid pattern. In another embodiment, the exterior portion 470 can include a plurality of grooves arranged in a grid or other pattern. In further embodiments, the exterior portion 470 can include other features giving it an uneven surface texture. Such features can include, for example, bumps, channels, spikes, ribs, perforations, etc.

One feature of the caul 450 is that ridges 472 can facilitate the diffusion of resin through compressed fiber plies in a manner similar to the flow medium 240 described above with reference to FIG. 2. One advantage of this feature is that the flow medium 240 can be omitted when laminating with the caul 450 in certain embodiments. Omitting the flow media can reduce cost and simplify the manufacturing process.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

I claim

1. A method for manufacturing a part, the method comprising:
    positioning a plurality of fibers on a mold surface of a tool, wherein a first portion of the fibers lay substantially flat against a side region of the mold surface;
    positioning a curved base portion of a caul over the first portion of the fibers; and
    pressing the curved base portion of the caul toward the side region of the mold surface to flatten the base portion against the first portion of fibers and compress a second portion of the fibers against a transition region of the mold surface.

2. The method of claim 1, further comprising positioning a sealing layer over the caul, wherein pressing the base portion of the caul toward the side region of the mold surface includes removing at least some air from between the sealing layer and the mold surface.

3. The method of claim 1, further comprising flowing resin between the caul and the mold surface to infuse the plurality of fibers with resin while the curved base portion of the caul is pressed toward the side region of the mold surface.

4. The method of claim 1, further comprising:
    positioning a sealing layer over the caul; and
    flowing resin between the caul and the mold surface after removing at least some air from between the sealing layer and the mold surface.

5. The method of claim 1 wherein the transition region of the mold surface is a first transition region, wherein pressing the curved base portion of the caul toward the side region of the mold surface causes a first corner portion of the caul to move outwardly relative to the base portion and compress the second portion of the fibers against the first transition region, and wherein pressing the curved base portion of the caul toward the side region of the mold surface further causes a second corner portion of the caul to move outwardly relative to the base portion and compress a third portion of the fibers against a second transition region of the mold surface.

6. The method of claim 1 wherein positioning a plurality of fibers on a mold surface of a tool includes positioning a plurality of fibers on a female mold surface.

7. The method of claim 1 wherein the transition region of the mold surface is a first transition region, and wherein positioning a plurality of fibers on the mold surface of the tool includes positioning the plurality of fibers on the first transition region and a second transition region spaced apart from the first transition region, the side region of the mold surface being positioned between the first and second transition regions.

8. The method of claim 1 wherein positioning a plurality of fibers on a mold surface of a tool includes positioning a plurality of dry fibers on the mold surface of the tool, and wherein the method further comprises flowing resin between the caul and the mold surface to infuse the plurality of dry fibers with resin.

9. A method for manufacturing a composite part, the method comprising:

positioning a plurality of fibers on a mold surface of a tool, wherein the mold surface includes a side region positioned between first and second transition regions, and wherein a first portion of the fibers contacts substantially the entire side region;

positioning a curved base portion of a caul over the first portion of the fibers; and flattening the curved base portion of the caul against the first portion of the fibers to compress the first portion of the fibers against the side region, to compress a second portion of the fibers against the first transition region, and to compress a third portion of the fibers against the second transition region.

10. The method of claim 9, further comprising positioning a sealing layer over the caul, wherein flattening the curved base portion of the caul against the first portion of the fibers includes removing at least some air from between the sealing layer and the mold surface.

11. The method of claim 9, further comprising flowing resin between the caul and the mold surface to infuse the plurality of fibers with resin while the curved base portion of the caul is flattened against the first portion of the fibers.

12. The method of claim 9, further comprising:

positioning a sealing layer over the caul; and flowing resin between the caul and the mold surface after removing at least some air from between the sealing layer and the mold surface.

* * * * *